United States Patent
Tao et al.

(10) Patent No.: US 11,194,972 B1
(45) Date of Patent: Dec. 7, 2021

(54) SEMANTIC SENTIMENT ANALYSIS METHOD FUSING IN-DEPTH FEATURES AND TIME SEQUENCE MODELS

(71) Applicant: INSTITUTE OF AUTOMATION, CHINESE ACADEMY OF SCIENCES, Beijing (CN)

(72) Inventors: Jianhua Tao, Beijing (CN); Ke Xu, Beijing (CN); Bin Liu, Beijing (CN); Yongwei Li, Beijing (CN)

(73) Assignee: INSTITUTE OF AUTOMATION, CHINESE ACADEMY OF SCIENCES, Beijing (CN)

( * ) Notice: Subject to any disclaimer, the term of this patent is extended or adjusted under 35 U.S.C. 154(b) by 0 days.

(21) Appl. No.: 17/464,421

(22) Filed: Sep. 1, 2021

(30) Foreign Application Priority Data

Feb. 19, 2021 (CN) .......................... 202110188618.5

(51) Int. Cl.
| | | |
|---|---|---|
| G06F 17/00 | (2019.01) | |
| G06F 40/30 | (2020.01) | |
| G06F 40/284 | (2020.01) | |
| G06N 3/04 | (2006.01) | |

(52) U.S. Cl.
CPC ............ *G06F 40/30* (2020.01); *G06F 40/284* (2020.01); *G06N 3/0454* (2013.01)

(58) Field of Classification Search
None
See application file for complete search history.

(56) References Cited

U.S. PATENT DOCUMENTS

| | | | | |
|---|---|---|---|---|
| 10,311,144 B2* | 6/2019 | Bellegarda | .......... | G06F 3/04817 |
| 2019/0355346 A1* | 11/2019 | Bellegarda | ............ | G06F 40/284 |
| 2020/0104369 A1* | 4/2020 | Bellegarda | ............. | G06F 40/30 |
| 2020/0250267 A1* | 8/2020 | Agarwal | ................. | G06F 40/30 |
| 2020/0364301 A1* | 11/2020 | Khosla | ................. | G06N 3/0454 |

FOREIGN PATENT DOCUMENTS

| | | |
|---|---|---|
| CN | 110569508 A | 12/2019 |
| CN | 110826336 A | 2/2020 |
| CN | 110956044 A | 4/2020 |
| CN | 111259142 A | 6/2020 |
| CN | 111859978 A | 10/2020 |
| CN | 112287106 A | 1/2021 |

OTHER PUBLICATIONS

First Office Action issued in counterpart Chinese Patent Application No. 202110188618.5, dated Apr. 6, 2021.

* cited by examiner

*Primary Examiner* — Satwant K Singh

(74) *Attorney, Agent, or Firm* — Westbridge IP LLC

(57) ABSTRACT

Disclosed is a semantic sentiment analysis method fusing in-depth features and time sequence models, including: converting a text into a uniformly formatted matrix of word vectors; extracting local semantic emotional text features and contextual semantic emotional text features from the matrix of word vectors; weighting the local semantic emotional text features and the contextual semantic emotional text features by using an attention mechanism to generate fused semantic emotional text features; connecting the local semantic emotional text features, the contextual semantic emotional text features and the fused semantic emotional text features to generate global semantic emotional text features; and performing final text emotional semantic analysis and recognition by using a softmax classifier and taking the global semantic emotional text features as input.

7 Claims, 3 Drawing Sheets

SEMANTIC SENTIMENT ANALYSIS METHOD FUSING IN-DEPTH FEATURES AND TIME SEQUENCE MODELS

CROSS-REFERENCE TO RELATED APPLICATION

The present disclosure claims priority to Chinese Patent Application CN202110188618.5 entitled "Semantic sentiment analysis method fusing in-depth features and time sequence models" filed on Feb. 19, 2021, the entire content of which is incorporated herein by reference.

FIELD OF THE INVENTION

The present disclosure relates to the field of data processing, and in particular to a semantic sentiment analysis method fusing in-depth features and time sequence models.

BACKGROUND OF THE INVENTION

In recent years, sentiment analysis technology has played an important role in the fields of artificial intelligence and human-computer interaction. Emotional standards for testing generally are "seven major" basic emotions. Various types of technologies are used to detect emotions, such as facial expression, physiological signal, voice signal, and text information. Nowadays, as the Internet has entered every household and various application platforms have emerged therewith, people are becoming more and more accustomed to using texts to express their emotions and opinions. Therefore, from a point of view of application, detection of emotions in texts becomes increasingly important.

However, the same word may have completely opposite meanings in different contexts due to the polysemous nature of text language, so how to do text sentiment analysis well is a long-term and difficult challenge. The existing technologies mostly use traditional language features and machine learning methods, and deep learning is mostly focused on a single model and a single feature. These approaches have a common obvious shortcoming that extraction of feature is too single to achieve effective and complete extraction of emotional information so that an effect of sentiment analysis is limited and affected. Patent Application Publication No. CN110826336A relates to an emotion classification method, system, storage medium and equipment, in which the context is encoded by using a position word vector and multi-head self-attention, and target words are encoded by using a bidirectional gated recurrent unit and multi-head self-attention; semantic information and position information of long range and short range sentences are fully extracted, meanwhile, an obtained context semantic information and an obtained target word semantic information are subjected to low-order fusion by interactively splicing them together; position encoding is performed on the basis of the low-order fusion by using a capsule network, and then the information after the low-order fusion is subjected to high-order fusion by means of a multi-head interactive attention mechanism, and then information of the high-order fusion undergoing average-pooling is spliced with the target word semantic information undergoing average-pooling and the context semantic information undergoing average-pooling to obtain target feature representations. This solution realizes full fusion of the context semantic information, the target word semantic information, and the position information, and improves accuracy and efficiency of emotion classification.

Patent Application Publication No. CN111259142A provides a specific target emotion classification method based on attention coding and graph convolutional networks, including steps of: obtaining hidden state vectors corresponding to the context and a specific target through a preset bidirectional recurrent neural network model, and performing multi-head self-attention coding on the hidden state vectors, respectively; then, extracting syntax vectors in a syntactic dependency tree corresponding to the context through a graph convolutional neural network combined with point-wise convolution, and performing multi-head self-attention coding on the syntax vectors; then, interactively fusing syntactic information codes with context semantic information codes, and fusing the syntactic information codes with the specific target semantic information codes, respectively, by means of multi-head interactive attention, and splicing the fused results with the context semantic information codes to obtain final feature representations, and obtaining an emotion classification result of the specific target based on the feature representations. This solution takes into account the correlations between the context and the syntactic information and the correlations between the specific target and the syntactic information, and improves accuracy of emotion classification.

SUMMARY OF THE INVENTION

The present disclosure provides a semantic sentiment analysis method fusing in-depth features and time sequence models, including steps of:

S1, preprocessing a text to convert the text into a uniformly formatted matrix of word vectors;

S2, extracting local semantic emotional text features and contextual semantic emotional text features by taking the matrix of word vectors as input;

S3, weighting the local semantic emotional text features and the contextual semantic emotional text features by using an attention mechanism to generate fused semantic emotional text features;

S4, connecting the local semantic emotional text features, the contextual semantic emotional text features, and the fused semantic emotional text features to generate global semantic emotional text features; and S5, performing final text emotional semantic analysis and recognition by using a softmax classifier and taking the global semantic emotional text features as input.

In some embodiments of the present disclosure, converting the text into a uniformly formatted matrix of word vectors includes:

S11, word cutting, in which the word cutting is applied on a text of Chinese, but no word cutting is applied on a text of English;

S12, cleaning, in which the text subjected to the word cutting is cleaned; and

S13, word embedding, in which the cleaned text is subjected to word embedding with pre-trained word vectors to obtain the matrix of word vectors.

In some embodiments of the present disclosure, converting the text into a uniformly formatted matrix of word vectors further includes:

data length processing, in which a length of each data input sequence is set to N, wherein a sentence with a text length less than N is filled up with zero vectors, while a sentence with a text length greater than the length N is cut off, so that the matrix of word vectors of data of each text is finally of N×d.

In some embodiments of the present disclosure, converting the text into a uniformly formatted matrix of word vectors further includes:

cross-language word embedding, in which a conversion matrix that serves as a conversion bridge between vocabulary vectors of two different languages is found and used so that word vectors of the two different languages are more approximate to each other.

In some embodiments of the present disclosure, a convolutional neural network is employed to extract the local semantic emotional text features.

In some embodiments of the present disclosure, a bidirectional long short-term memory network Bi-LSTM is employed to extract the contextual semantic emotional text features.

In some embodiments of the present disclosure, according to settings, outputs of the bidirectional long short-term memory network Bi-LSTM and the convolutional neural network have the same width with each other, but have different lengths from each other; and according to a scaled dot-product attention mechanism, a corresponding attention weight formula is, $$w_s = \frac{\exp(\text{score}(h_c, h_l))}{\sum \exp(\text{score}(h_c, h_l))}$$

where $h_c$ and $h_l$ are the outputs of the convolutional neural network and the bidirectional long short-term memory network, respectively, and $\text{score}(h_c, h_l)$ is an alignment score which measures a similarity between $h_c$ and $h_l$; and using the attention weight $w_s$ and $h_l^T$, fused feature vectors $h_{cl}$ carrying key emotional information are calculated, and a vector of the last dimension of $h_{cl}$ is taken and recorded as $h_{attention}$ to serve as a fused semantic emotional text feature vector finally output.

In some embodiments of the present disclosure, to generate global semantic emotional text features is to connect the local semantic emotional text features $h_{CNN}$, the contextual semantic emotional text features $h_{LSTM}$, and the fused semantic emotional text features $h_{attention}$ into the global semantic emotional text features $C=[h_{CNN}, h_{LSTM}, h_{attention}]$.

In some embodiments of the present disclosure, after input into a fully connected layer, the global semantic emotion text features are then input into the softmax classifier to implement final text emotional semantic analysis and recognition.

In some embodiments of the present disclosure, the text emotional semantic analysis and recognition adopts a cross-entropy loss function for model training.

The foregoing provided by the embodiments of the present application have advantages that: a new dual neural network model based on an attention mechanism is provided. After semantic emotional feature information of a text is obtained by encoding the text using Bi-LSTM and CNN, the attention mechanism is used to dynamically fuse these two features to obtain important emotional relationship in the text. Then, the last three feature representations are combined together, and then subjected to a fully connected layer, a softmax classifier, and a cross-entropy loss function for a final training of a model. The optimized model can effectively perform semantic sentiment analysis, thereby improving accuracy of emotion recognition.

BRIEF DESCRIPTION OF THE DRAWINGS

The drawings here are incorporated into the specification and constitute a part of the specification, which illustrate embodiments in accordance with the present disclosure and is applicable to explain the principle of the present disclosure together with the specification.

In order to more clearly describe the technical solutions in the embodiments of the present disclosure or the existing solutions in the art, accompanying drawings needed in the description of the embodiments or the existing solutions will be briefly introduced below. Apparently, for those of ordinary skill in the art, other drawings can be obtained based on these drawings without any inventive labor involved.

DETAILED DESCRIPTION OF THE EMBODIMENTS

In order to make purposes, technical solutions and advantages of the embodiments of the present disclosure more definite, the technical solutions of the embodiments of the present disclosure will be described clearly and completely below in conjunction with accompanying drawings. Apparently, the embodiments described herein merely constitute a portion, rather than the whole, of the embodiments of the present disclosure. On the basis of the embodiments of the present disclosure, all other embodiments obtained by those of ordinary skill without any inventive labor involved should fall within the protection scope of the present disclosure.

Figure 1:
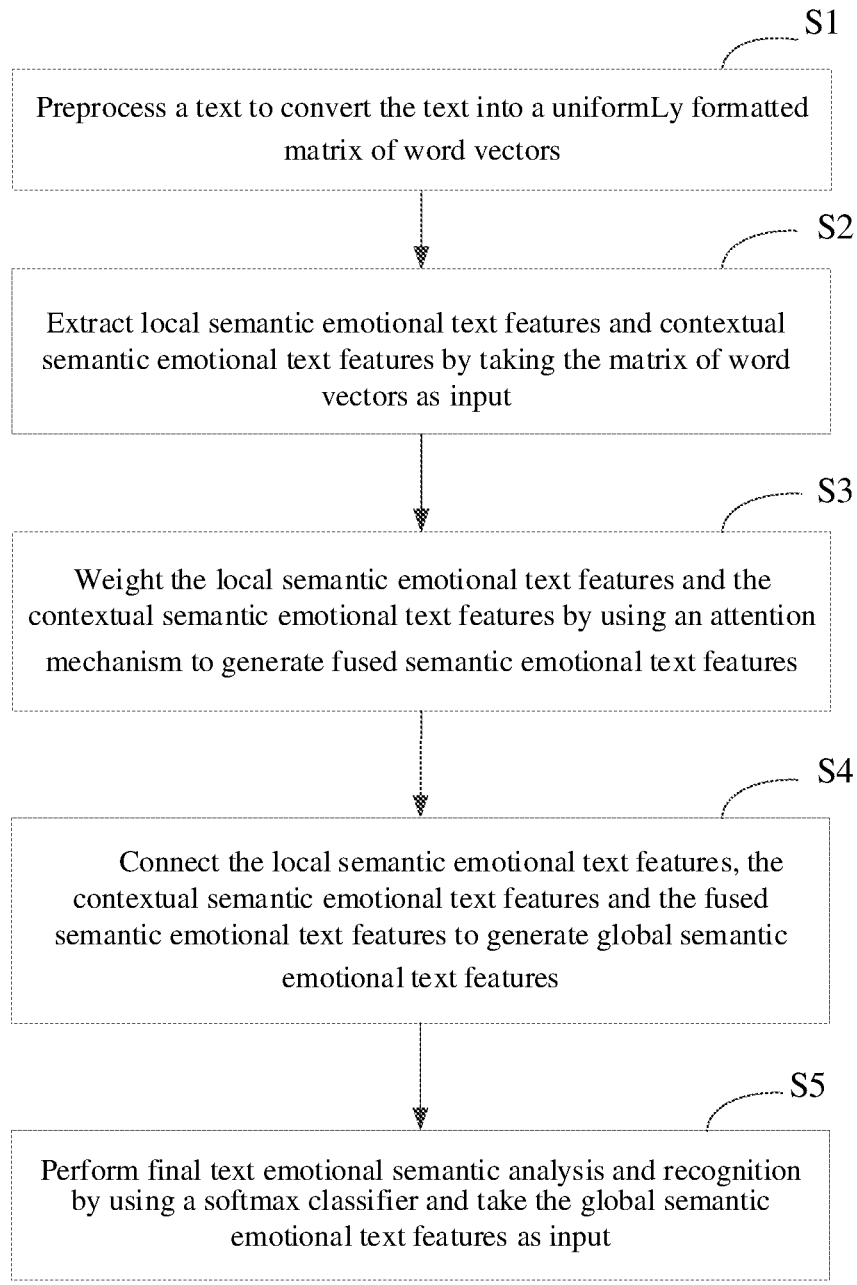
FIG. 1 is a flowchart of a semantic sentiment analysis method fusing in-depth features and time sequence models according to an exemplary embodiment of the present disclosure.

In FIG. 1, shown is a semantic sentiment analysis method fusing in-depth features and time sequence models provided by an embodiment of the present disclosure, including steps S1 to S5.

In step S1, a text is preprocessed to be converted into a uniformly formatted matrix of word vectors.

In step S2, local semantic emotional text features and contextual semantic emotional text features are extracted by taking the matrix of word vectors as input.

In step S3, the local semantic emotional text features and the contextual semantic emotional text features are weighted by using an attention mechanism, and fused semantic emotional text features are generated thereby.

In step S4, the local semantic emotional text features, the contextual semantic emotional text features, and the fused semantic emotional text features are connected into global semantic emotional text features.

In step S5, final text emotional semantic analysis and recognition is performed by using a softmax classifier and taking the global semantic emotional text features as input.

Figure 2:
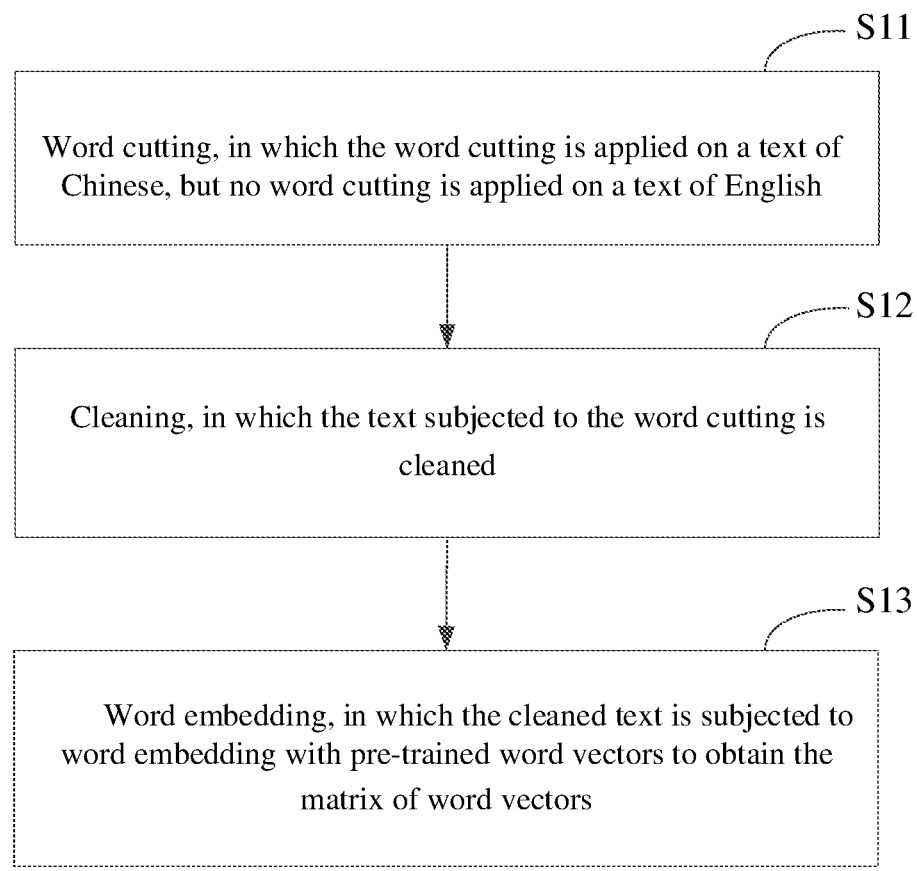
FIG. 2 is a flowchart of steps of converting the text into a uniformly formatted matrix of word vectors according to an exemplary embodiment of the present disclosure.

In FIG. 2, shown is a flowchart of steps of converting the text into a uniformly formatted matrix of word vectors according to an exemplary embodiment of the present disclosure. According to these above, further, a specific approach for converting the text into a uniformly formatted matrix of word vectors includes steps S11 to S13.

In step S11, word cutting, in which word cutting is applied on a text of Chinese, but no word cutting is applied on a text of English.

In step S12, cleaning, in which the text subjected to the word cutting is cleaned.

In step S13, word embedding, in which the cleaned text is subjected to word embedding with pre-trained word vectors to obtain the matrix of word vectors.

According to these above, further, the specific approach for converting the text into a uniformly formatted matrix of word vectors further includes:

data length processing, in which a length of each data input sequence is set to N, where a sentence with a text length less than N is filled up with zero vectors, while a sentence with a text length greater than the length N is cut off, so that the word vector matrix of data of each text is finally of N×d.

According to the above, further, the specific approach for converting the text into a uniformly formatted matrix of word vectors further includes:

cross-language word embedding, in which a conversion matrix that serves as a conversion bridge between vocabulary vectors of two different languages is found and used so that word vectors of the two different languages approximate to each other further.

According to the above, further, the matrix of word vectors is input into a convolutional neural network which is employed to extract local semantic emotional text features.

According to the above, further, the matrix of word vectors is input into a bidirectional long short-term memory network which is employed to extract contextual semantic emotional text features.

According to the above, further, according to settings, outputs of the bidirectional long short-term memory network Bi-LSTM and the convolutional neural network (CNN) have the same width with each other, but different lengths from each other. In some embodiments, according to scaled dot-product attention mechanism, a corresponding attention weight formula can be obtained as:

$$w_s = \frac{\exp(score(h_c, h_l))}{\sum \exp(score(h_c, h_l))}$$

where $h_c$ and $h_l$ are the outputs of the convolutional neural network and the bidirectional long short-term memory network, respectively, and $score(h_c,h_l)$ is an alignment score which measures a similarity between $h_c$ and $h_l$;

Using the attention weight $w_s$ and $h_l^T$, fused feature vectors $h_{cl}$ carrying key emotional information are calculated, and a vector of the last dimension of $h_{cl}$ is taken and recorded as $h_{attention}$ to serve as a fused semantic emotional text feature vector finally output, where $h_l^T$ is the transpose of $h_l$.

According to the above, further, a specific approach for generating the global semantic emotional text features is connecting the local semantic emotional text features $h_{CNN}$, the contextual semantic emotional text features $h_{LSTM}$, and the fused semantic emotional text features $h_{attention}$ to generate the global semantic emotional text features C=[$h_{CNN}$, $h_{LSTM}$, $h_{attention}$].

According to the above, further, after the global semantic emotion text features are input into a fully connected layer, the global semantic emotion text features are then input into the softmax classifier to implement the final text emotional semantic analysis and recognition.

According to the above, further, the text emotional semantic analysis and recognition adopts a cross-entropy loss function for model training.

A specific implementation method includes following steps S1 to S5.

In step S1, a text is preprocessed and converted into a uniformly formatted matrix of word vectors.

In an embodiment where the same languages are involved, a format of the input text is that of a preprocessed text S, which may be expressed as:

$$S=[w_1, w_i \ldots w_N] \in R^{N \times d}$$

where N is a unified length of text data, and d is the dimension of a word vector. In some embodiments, for an English text, pre-trained word vectors used are Glove, while for a Chinese text, pre-trained word vectors used are the encyclopedia Chinese word vectors, and a training model is a skip-gram model. It should be noted that since all input texts are required to have a unified length, the data lengths need to be processed. N is set to be the length of each data input sequence, then a sentence with a text length less than N should be filled up with zero vectors, and a sentence with a text length greater than N should be cut off, so that the word vector matrix of data of each text is finally of N×d.

In an embodiment where different languages are involved, in the process of cross-language word embedding, it is necessary to find a conversion bridge between the two different vocabulary vectors, that is, a conversion matrix f, so that word vectors of the two (a word embedding matrix S of a source language, a word embedding matrix T of a target language) can be more approximate to each other, i.e., $$S(w_i) \xrightarrow{f} T(w_i).$$

In this case, $w_i$ is word embedding of the i-th entry.

In step S2, local semantic emotional features and contextual semantic emotional features are extracting, respectively, through a convolutional neural network CNN and a bidirectional long short-term memory network Bi-LSTM.

The convolutional neural network CNN and the bidirectional long short-term memory network Bi-LSTM are connected in parallel, and utilize their respective structural advantages to extract varied semantic emotional features, respectively.

The convolutional neural network focuses more on local information, and this characteristic can be utilized to extract the local semantic emotional features, a specific formula of which is, $$x_i^s = f(W \cdot S[i:i+s-1]+b)$$

where b is a bias value, W is a weight value of a convolution kernel, f is a nonlinear activation function, and $S[i:i+s-1]$ represents a sub-matrix of the text S from i to i+s−1.

A local vector generated by each word window, after going through convolution operation, will generate a new vector, which is expressed as:

$$x_s=[x_1^s, \ldots x_i^s \ldots, x_{N+s-1}^s]$$

Since a size of a feature map generated by each filter varies depending on a sentence length and a size of filter area, pooling is applied to each feature map so as to generate a vector of fixed length. One strategy is Maxpooling, which maps the vector $x_i^s$ to a vector of fixed length. In some embodiments, the length of the vector is determined according to a hyper-parameter (i.e., a quantity of hidden units in a convolutional layer) configured by a user.

$$x_{max}^s=\{x_1^s, \ldots x_i^s \ldots, x_{N+s-1}^s\}$$

$$h_{max}=[x_{max}^s]$$

Finally, this model will have two output vectors. One is a result vector of the convolution operation which is used as an input $h_c$ of a feature fusion mechanism; and the other is a feature vector resulted from the pooling operation which is flattened to serve as features $h_{CNN}$ extracted by a subnet of the convolutional layer.

Structure of memory cells of the bidirectional long short-term memory network Bi-LSTM can effectively focus on text feature information of the context, and this characteristic can be utilized to extract contextual semantic emotional features of the text, a specific formula of which is, $$h_i = \left[ \overrightarrow{L}(w_i^e, \overrightarrow{h_{i-1}}), \overleftarrow{L}(w_i^e, \overleftarrow{h_{i+1}}) \right]$$

where $h_i$ is an output of the i-th channel of the bidirectional long short-term memory network (Bi-LSTM), $\overrightarrow{L}$ and $\overleftarrow{L}$ are forward and backward outputs of the LSTM, respectively. In this case, $w_i^e$ is a word vector of a word $w_i$ in a sequence, $\overrightarrow{h_{i-1}}$ and $\overleftarrow{h_{i+1}}$ represents outputs of the previous LSTM.

Since the Bi-LSTM adopts a double-layer structure, an output of a first layer of the bidirectional long short-term memory network is exactly an input of a second layer of the bidirectional long short-term memory network. The output of the second layer of bidirectional long short-term memory network is divided into two parts, one being used as features extracted by the bidirectional long short-term memory network, and the other being used as an input of an attention mechanism. Specific formulas of the outputs of the Bi-LSTM are, $$h_l = [h_{1l}, \ldots, h_{il}, \ldots, h_{Nl}]$$

$$h_{LSTM} = h_{Nl}$$

where $h_l$ contains outputs of respective hidden layers, which is used as the input of the attention mechanism, and $h_{LSTM}$ is a final output of the last hidden layer, which is used as the features extracted by the bidirectional long short-term memory network.

In step S3, the local semantic emotional text features and the contextual semantic emotional text features are weighted by means of the attention mechanism to generate fused semantic emotional text features.

In order to further capture key emotional information in the text, the attention mechanism is chosen to process the semantic emotional features extracted through the above two subnets. Specifically, the attention mechanism is used to calculate a similarity between the contextual semantic emotional features and the local semantic emotional features so that those key emotional information are further focused on and performance of emotion recognition can be improved further. According to settings, the outputs of the bidirectional long short-term memory network Bi-LSTM and the convolutional neural network have the same width with each other, but have different lengths from each other. In some embodiments, according to a scaled dot-product attention mechanism, a corresponding attention weight formula may be derived as:

$$w_s = \frac{\exp(\text{score}(h_c, h_l))}{\sum \exp(\text{score}(h_c, h_l))}$$

where $h_c$ and $h_l$ are the outputs of the convolutional neural network and the bidirectional long short-term memory network, respectively, and $\text{score}(h_c, h_l)$ is an alignment score which measures a similarity between $h_c$ and $h_l$;

Using the attention weight $w_s$ and $h_l^T$, fused feature vectors $h_{cl}$ carrying key emotional information are calculated, and a vector of the last dimension of $h_{cl}$ is taken and recorded as $h_{attention}$ to serve as a fused semantic emotional text feature vector finally output.

In step S4, a specific method for generating global semantic emotional text features is connecting the local semantic emotional text features $h_{CNN}$, the contextual semantic emotional text features $h_{LSTM}$ and the fused semantic emotional text features $h_{attention}$ to generate global semantic emotional text features $C = [h_{CNN}, h_{LSTM}, h_{attention}]$.

In step S5, final text emotional semantic analysis and recognition is performed by using a fully connected layer, softmax, and a cross-entropy loss function.

After construction has been completed, the global semantic emotional text features C are fed to the fully connected layer, and subjected to a final training for a text emotional semantic analysis model by means of the softmax and the cross-entropy loss function. Specific formulas are, $$h_o = f(w_{o1}c + b_{o1})$$

$$o = f(w_{o2}c + b_{o2})$$

where f is the fully connected layer, $w_{o1}$、$b_{o1}$、$w_{o2}$ and $b_{o2}$ are weights and bias values, respectively. O is a final output of the fully connected layer, and $h_O$ is a first output of the fully connected layer.

A final classification result is obtained through the softmax classifier. As mentioned above, when sequences are given, sentiment y of each sequence needs to be predicted. Formulas for calculating a predicted value ŷ of such sentiment are, $$p(y|X) \text{soft} \max(w_p o + b_p)$$

$$\tilde{y} = \underset{y}{\arg\max} \ p(y|X)$$

where p is a prediction probability of a sentiment classification label, and $w_p$ and $b_p$ are parameters of the softmax classifier.

Then, the cross-entropy training loss function is used to average a final loss of all obtained sequences of sentiment classification labels. A formula thereof is as follows:

$$\text{Loss} = -\frac{1}{K} \sum_{k=1}^{K} Y_k \cdot \log p(y_n | X_n)$$

where K represents the number of types of sentiment labels, and Y represents sequences of sentiment classification labels $(Y = Y_1, Y_2, \ldots, Y_K)$. A subscript n represents the n-th input sequence.

Figure 3:
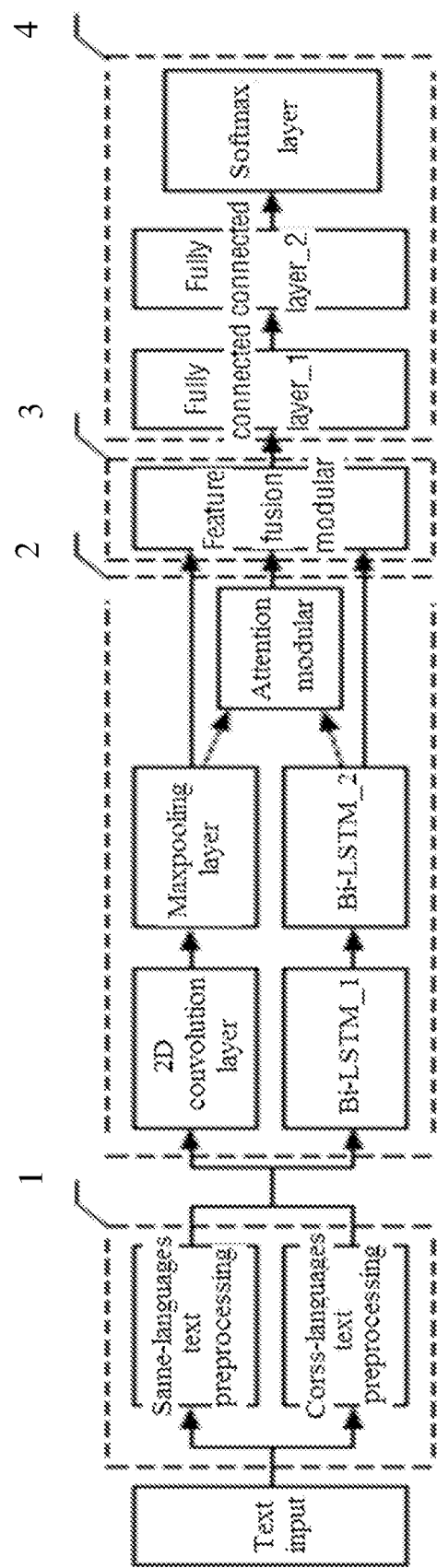
FIG. 3 is a structural diagram of a semantic sentiment analysis system fusing in-depth features and time sequence models according to an exemplary embodiment of the present application.

As shown in FIG. 3, a semantic sentiment analysis system fusing in-depth features and time sequence models includes a text preprocessing module 1, a multi-model feature extraction module 2, a global feature fusion module 3 and a text sentiment decoding and classification module 4, wherein the text preprocessing module 1 is connected to the multi-model feature extraction module 2, the multi-model feature extraction module 2 is connected to the global feature fusion module 3, and the global feature fusion module 3 is connected to the text sentiment decoding and classification module 4.

In the text preprocessing module 1, for data of same languages and of different languages, varied word vectors are adopted to convert a text into a word vector matrix. In particular, for the same language, pre-trained word vectors of one type are used, and a word embedding layer uses the pre-trained word vectors to converts the text into a corresponding word vector matrix. For the case of crossing languages, a corresponding conversion relationship between two types of word vectors is necessary to be found and utilized to deal with the different languages, respectively, so as to generate corresponding word vector matrices automatically.

In the case of same languages, a format of input text is the preprocessed text S, which may be expressed as:

$$S=[w_1, w_i \ldots w_N] \in R^{N \times d}$$

N is a unified length of text data, and d is the dimension of a word vector. In some embodiments, for an English text, pre-trained word vectors used are Glove, while for a Chinese text, pre-trained word vectors used are the encyclopedia Chinese word vectors, and a training model is a skip-gram model. It should be noted that since all input texts are required to have a unified length, the data lengths need to be processed. N is set to be the length of each data input sequence, then a sentence with a text length less than N should be filled up with zero vectors, and a sentence with a text length greater than N should be cut off, so that the word vector matrix of data of each text is finally of N×d.

In the case of different languages, with respect to cross-language word embedding, it is necessary to find a conversion bridge between the two different vocabulary vectors, that is, a conversion matrix f, so that word vectors of the two (a word embedding matrix S of a source language, a word embedding matrix T of a target language) can be more approximate to each other, i.e., $$\underset{f}{\operatorname{argmax}} \sum_i \|T_i f - S_i\|^2$$

$$S(w_i) \xrightarrow{f} T(w_i)$$

where $T_i$ and $S_i$ are word embedding of the i-th entries of the target language and the source language, respectively. The conversion matrix f is the least square solution of a matrix equation Tf=S. In some embodiments, the conversion matrix can be solved by means of Moore Penrose pseudo-inverse. Formulas are as follows:

$$T^+ = (T^T T)^{-1} T^T$$

$$f = T^+ S$$

In the multi-model feature extraction module 2, a convolutional neural network CNN and a bidirectional long short-term memory network Bi-LSTM are employed to extract local semantic emotional features and contextual semantic emotional features, respectively, and then the local semantic emotional features and the contextual semantic emotional features are weighted by means of an attention mechanism to generate more important fused semantic emotional text features.

The convolutional neural network CNN and the bidirectional long short-term memory network Bi-LSTM are connected in parallel, and utilize their respective structural advantages to extract varied semantic emotional features, respectively.

The convolutional neural network focuses more on local information, and this characteristic can be utilized to extract the local semantic emotional features, a specific formula of which is, $$x_i^s = f(W \cdot S[i:i+s-1] + b)$$

where b is a bias value, W is a weight value of a convolution kernel, f is a nonlinear activation function, and $S[i:i+s-1]$ represents a sub-matrix of the text S from i to $i+s-1$.

A local vector generated by each word window, after going through convolution operation, will generate a new vector, which is expressed as:

$$x_s = [x_1^s, \ldots x_i^s \ldots, x_{N+s-1}^s]$$

Since a size of a feature map generated by each filter varies depending on a sentence length and a size of filter area, pooling is applied to each feature map so as to generate a vector of fixed length. One common strategy is Maxpooling, which maps the vector $x_i^s$ to a vector of fixed length. In some embodiments, the length of the vector is determined according to a hyper-parameter (i.e., a quantity of hidden units in a convolutional layer) configured by a user.

$$x_{max}^s = \{x_1^s, \ldots x_i^s \ldots, x_{N+s-1}^s\}$$

$$h_{max} = [x_{max}^s]$$

Finally, this model will have two output vectors. One is a result vector of the convolution operation which is used as an input e of a feature fusion mechanism;

and the other is a feature vector resulted from the pooling operation which is flattened to serve as features h CNA extracted by a subnet of the convolutional layer.

Structure of memory cells of the bidirectional long short-term memory network Bi-LSTM can effectively focus on text feature information of the context, and this characteristic can be utilized to extract contextual semantic emotional features of the text, a specific formula of which is, $$h_i = \left[\overrightarrow{L}(w_i^e, \overrightarrow{h_{i-1}}), \overleftarrow{L}(w_i^e, \overleftarrow{h_{i+1}})\right]$$

where $h_i$ is an output of the i-th channel of the bidirectional long short-term memory network (Bi-LSTM), and $\overrightarrow{L}$ and $\overleftarrow{L}$ are forward and backward outputs of the LSTM, respectively.

Since the Bi-LSTM adopts a double-layer structure, an output of a first layer of the bidirectional long short-term memory network is exactly an input of a second layer of the bidirectional long short-term memory network. The output of the second layer of bidirectional long short-term memory network is divided into two parts, one being used as features extracted by the bidirectional long short-term memory network, and the other being used as an input of an attention mechanism. Specific formulas of the outputs of the Bi-LSTM are, $$h_l = [h_{1l}, \ldots, h_{il}, \ldots, h_{Nl}]$$

$$h_{LSTM} = h_{Nl}$$

where $h_l$ contains outputs of respective hidden layers, which is used as the input of the attention mechanism, and $h_{LSTM}$ is a final output of the last hidden layer, which is used as the features extracted by the bidirectional long short-term memory network.

In order to further capture key emotional information in the text, the attention mechanism is chosen to process the semantic emotional features extracted by the above two subnets. Specifically, the attention mechanism is used to calculate a similarity between the contextual semantic emotional features and the local semantic emotional features so that those key emotional information are further focused on and performance of emotion recognition can be improved further. According to settings, the outputs of the bidirectional long short-term memory network Bi-LSTM and the convolutional neural network have the same width with each other, but have different lengths from each other. In some embodiments, according to a scaled dot-product attention mechanism, a corresponding attention weight formula may be derived as:

$$w_s = \frac{\exp(\text{score}(h_c, h_l))}{\sum \exp(\text{score}(h_c, h_l))}$$

where $h_c$ and $h_l$ are the outputs of the convolutional neural network and the bidirectional long short-term memory network, respectively, and score($h_c$,$h_l$) is an alignment score which measures a similarity between $h_c$ and $h_l$;

Using the attention weight $w_s$ and $h_l^T$, a fused feature vectors $h_{cl}$ carrying key emotional information is calculated, and a vector of the last dimension of $h_{cl}$ is taken and recorded as $h_{attention}$ to serve as a fused semantic emotional text feature vector finally output.

In the global feature fusion module 3, three semantic emotional features generated by the multi-model feature extraction module 2 are spliced and combined into a global semantic emotional feature which overcomes a shortcoming of a single-model in the past due to insufficiency of features. The local semantic emotional text features $h_{CNN}$, the contextual semantic emotional text features $h_{LSTM}$ and the fused semantic emotional text features $h_{attention}$ are connected to generate global semantic emotional text features C=[$h_{CNN}$, $h_{LSTM}$,$h_{attention}$].

In the text sentiment decoding and classification module 4, after the final global semantic sentiment text features has been generated, a fully connected layer, a softmax classifier and a cross-entropy loss function are adopted for training of a model which can be used for text sentiment analysis and recognition.

After construction has been completed, the global semantic emotional text features C are fed to the fully connected layer, and subjected to a final training for a text emotional semantic analysis model by using the softmax and the cross-entropy loss function. Specific formulas are, $$h_o = f(w_{o1}c + b_{o1})$$

$$o = f(w_{o2}c + b_{o2})$$

where f is the fully connected layer, $w_{o1}$、$b_{o1}$、$w_{o2}$ and $b_{o2}$ are weights and bias values, respectively. O is a final output of the fully connected layer.

A final classification result is obtained through the softmax classifier. As mentioned above, when sequences are given, sentiment y of each sequence needs to be predicted. Formulas for calculating a predicted value ỹ of such sentiment are, $$p(y|X) \text{soft max}(w_p o + b_p)$$

$$\tilde{y} = \underset{y}{\text{argmax}}\ p(y|X)$$

where p is a prediction probability of a sentiment classification label, and $w_p$ and $b_p$ are parameters of the softmax classifier.

Then, the cross-entropy training loss function is used to average a final loss of all obtained sequences of sentiment classification labels. A formula thereof is as follows:

$$\text{Loss} = -\frac{1}{K}\sum_{k=1}^{K} Y_k \cdot \log p(y_n|X_n)$$

where Y represents sequences of sentiment classification labels (Y=$Y_1$, $Y_2$, ..., $Y_K$). A subscript n represents the n-th input sequence.

In the exemplary technical solution of the present disclosure, the word embedding layer has completed two tasks. In an emotion recognition task involving a single language, the word embedding layer uses a pre-trained word vector method and performs fine-tuning to pre-trained word vectors so as to better understand the semantic emotion information of experimental data; the improved representation of word vectors can further improve the performance of text emotion recognition. In particular, in an emotion recognition task crossing languages, co-occurrence extent between different language vocabularies and spatial relationship of their corresponding word embedding are utilized to carry out cross-language relationship conversion and to construct cross-language word vectors, so that word vectors of two different languages can be more approximate to each other and accuracy of emotion recognition can be improved thereby.

In the exemplary technical solution of the present disclosure, based on a framework of deep neural networks, two neural network models BiLSTM and CNN are employed as encoders for extraction of sentence features, and complete and sufficient sentence semantic emotions can be extracted through cooperation of the BiLSTM and the CNN, thereby improving accuracy of emotion recognition.

The exemplary technical solution of the present disclosure provides a new dual neural network model based on an attention mechanism. After semantic emotional feature information of a text is obtained by encoding the text using the Bi-LSTM and the CNN, the attention mechanism is used to dynamically fuse these two features to obtain important emotional relationship in the text. Then, the last three feature representations are combined together, and then subjected to a fully connected layer, a softmax classifier and a cross-entropy loss function for a final training of a model. The optimized model can effectively perform semantic sentiment analysis, thereby improving accuracy of emotion recognition.

It should be noted that, in this document, relational terms such as "first" and "second" are merely used to distinguish one entity or operation from another entity or operation, and do not intent to require or imply any such actual relationship or sequence between these entities or operations. Moreover, wordings "include", "comprise" or any other variants thereof are intended to cover non-exclusive inclusion, so that a process, method, article or device including a series of elements not only includes those elements, but also include other elements that have not been listed definitely or elements inherent to the process, method, article, or device. Except that there is further limitation, an element defined by the wordings, such as "include a . . . " does not exclude existence of other identical elements included in the process, method, article, or device including said element.

These above are only specific embodiments of the present disclosure to facilitate understanding or implementation of the present disclosure by those skilled in the art. Various modifications to these embodiments will be apparent to those skilled in the art, and the general principles defined herein can be implemented in other embodiments without departing from the spirit or scope of the present disclosure. Therefore, the present disclosure will not be limited to the embodiments illustrated in this document, but should conform to the broadest scope consistent with the principles and novel features provided in this document.

What is claimed is:

1. A semantic sentiment analysis method fusing in-depth features and time sequence models, comprising steps of:

S1, preprocessing a text to convert the text into a uniformly formatted matrix of word vectors;

S2, extracting local semantic emotional text features and contextual semantic emotional text features by taking the matrix of word vectors as input of each of a convolutional neural network and a bidirectional long short-term memory network, wherein the local semantic emotional text features are extracted by using the convolutional neural network, and the contextual semantic emotional text features are extracted by using the bidirectional long short-term memory network;

S3, weighting the local semantic emotional text features and the contextual semantic emotional text features by using an attention mechanism to generate fused semantic emotional text features, wherein according to settings, outputs of the bidirectional long short-term memory network and the convolutional neural network have a same width with each other, but have different lengths from each other, and wherein according to a scaled dot-product attention mechanism, a corresponding attention weight formula is, $$w_s = \frac{\exp(\text{score}(h_c, h_l))}{\sum \exp(\text{score}(h_c, h_l))}$$

where $h_c$ and $h_l$ are the outputs of the convolutional neural network and the bidirectional long short-term memory network, respectively, and $\text{score}(h_c,h_l)$ is an alignment score which measures a similarity between $h_c$ and $h_l$, and where by using the attention weight $w_s$ and $h_l^T$, fused feature vectors $h_{cl}$ carrying key emotional information are calculated, and a vector of the last dimension of $h_{cl}$ is taken and recorded as $h_{attention}$ to serve as a fused semantic emotional text feature vector to be finally output;

S4, connecting the local semantic emotional text features, the contextual semantic emotional text features and the fused semantic emotional text features to generate global semantic emotional text features; and S5, performing final text emotional semantic analysis and recognition by using a softmax classifier and taking the global semantic emotional text features as input.

2. The method according to claim 1, wherein converting the text into a uniformly formatted matrix of word vectors includes:

S11, word cutting, in which the word cutting is applied on a text of Chinese, but no word cutting is applied on a text of English;

S12, cleaning, in which the text subjected to the word cutting is cleaned; and

S13, word embedding, in which the cleaned text is subjected to word embedding with pre-trained word vectors to obtain the matrix of word vectors.

3. The method according to claim 2, wherein converting the text into a uniformly formatted matrix of word vectors further includes:

data length processing, in which a length of each data input sequence is set to N, wherein a sentence with a text length less than N is filled up with zero vectors, while a sentence with a text length greater than the length N is cut off, so that the matrix of word vectors of data of each text is of N×d.

4. The method according to claim 2, wherein converting the text into a uniformly formatted matrix of word vectors further includes:

cross-language word embedding, in which a conversion matrix that serves as a conversion bridge between vocabulary vectors of two different languages is found and used so that word vectors of the two different languages are more approximate to each other.

5. The method according to claim 1, wherein to generate global semantic emotional text features is to connect the local semantic emotional text features $h_{CNN}$, the contextual semantic emotional text features $h_{LSTM}$, and the fused semantic emotional text features $h_{attention}$ into the global semantic emotional text features $C=[h_{CNN}, h_{LSTM}, h_{attention}]$.

6. The method according to claim 1, wherein the global semantic emotion text features are input to be processed through a fully connected layer and then the softmax classifier for implementation of the final text emotional semantic analysis and recognition.

7. The method according to claim 6, wherein the text emotional semantic analysis and recognition uses a cross-entropy loss function for model training.

* * * * *